May 3, 1927.
E. C. HEAD
PAIR OF GEARS
Filed Sept. 12, 1923
1,626,820
2 Sheets-Sheet 2
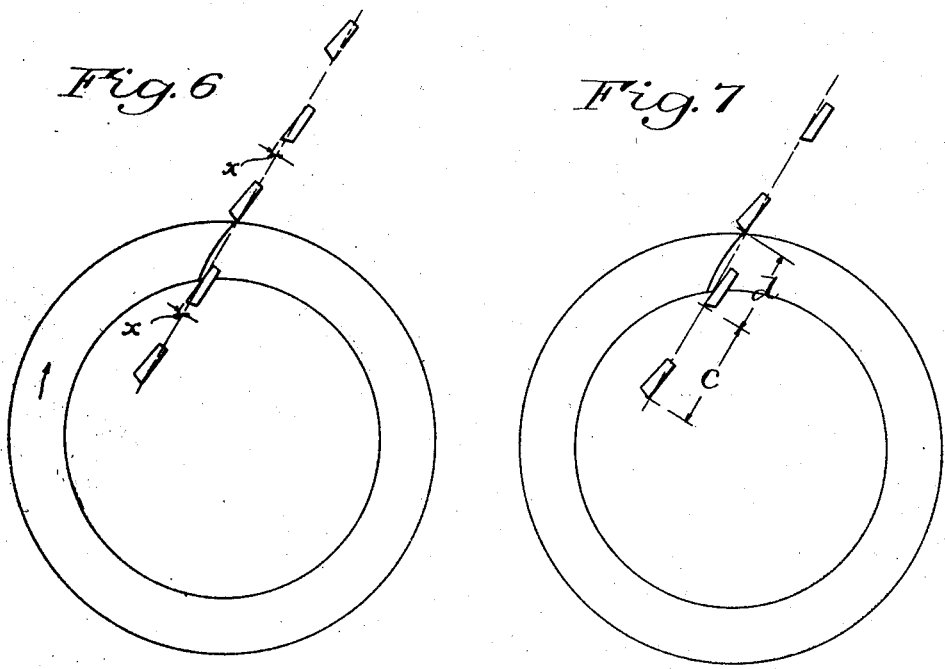
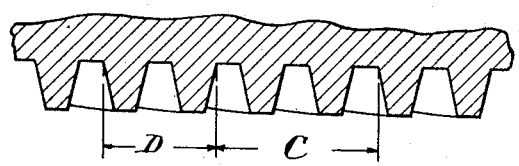
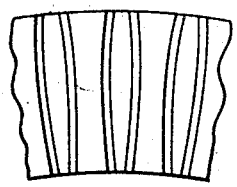
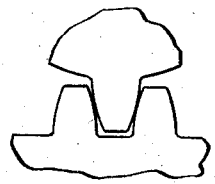
INVENTOR.
Ernest C. Head
his ATTORNEY Patented May 3, 1927.

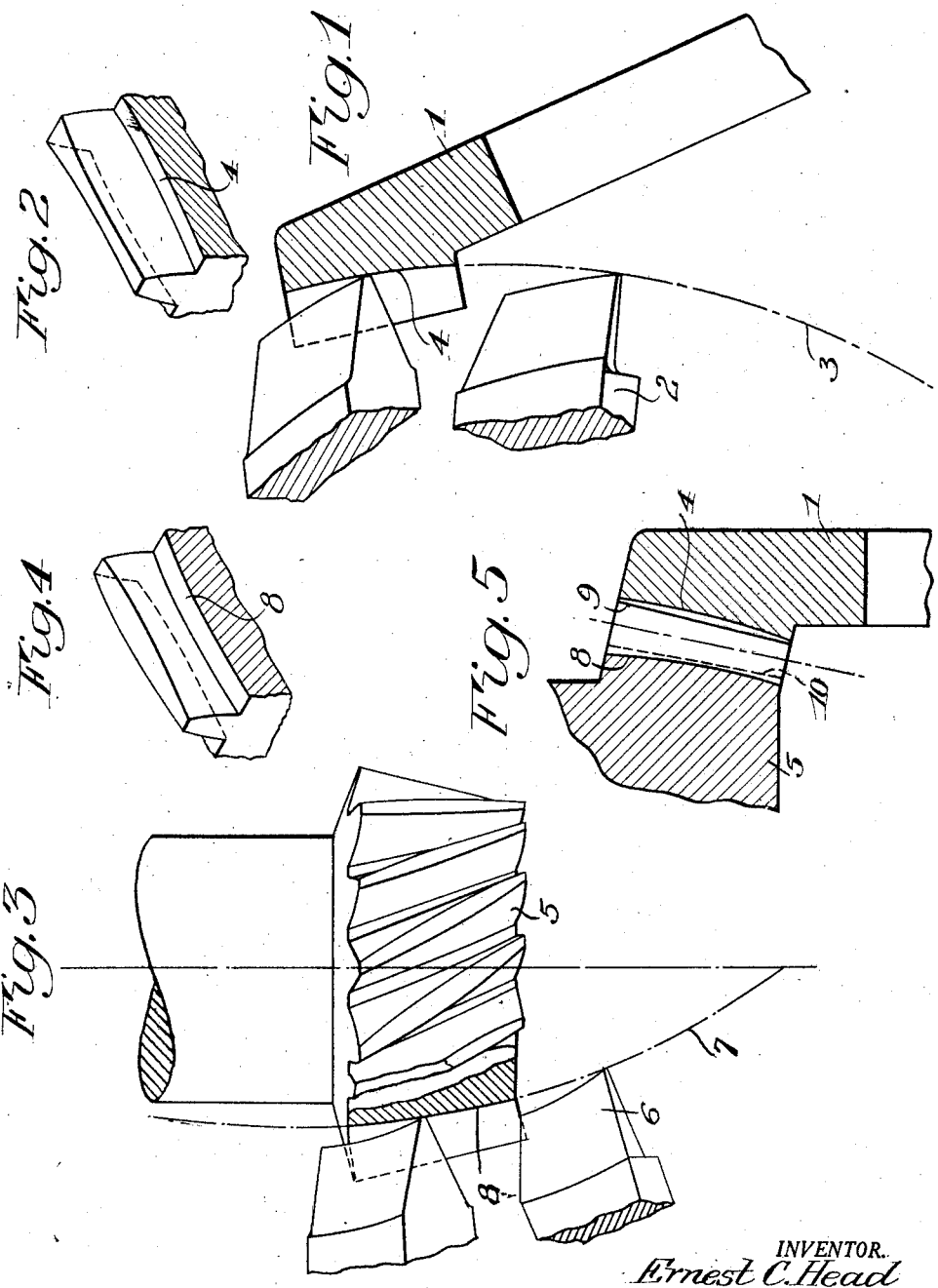

1,626,820

UNITED STATES PATENT OFFICE.

ERNEST C. HEAD, OF ROCHESTER, NEW YORK, ASSIGNOR TO GLEASON WORKS, OF ROCHESTER, NEW YORK, A CORPORATION OF NEW YORK.

PAIR OF GEARS.

Application filed September 12, 1923. Serial No. 662,273.

My invention relates to a gear pair, and more particularly to the formation of an intermeshing bevel gear and pinion of spiral or curved tooth generated type such as commonly employed in rear axle automobile drives, although it is not restricted to this particular application but possesses important features of advantage in other applications, such as straight tooth gears, or spur gears.

One of the chief purposes of the improvement is to afford a gear pair constructed with a circular edge mill, in such a way that no correction is required on the teeth to overcome the irregularity resulting from the cutting edge of a tool being inclined to its plane of rotation, such difference being cared for by making one member of the pair an exact counterpart of the other with respect to the profiles or cooperating faces of the teeth.

A further purpose of the invention is to afford a gear pair constructed by a system that lends itself readily to a hobbing or continuously cutting process resulting in a speedy, economical operation and producing a practical, efficient and accurate pair of gears.

To these and other ends, the invention comprises the structure that will appear clearly from the following description, when read in conjunction with the accompanying drawings, the novel features being pointed out in the claims following the description.

In the drawings:

Figure 1 is a sectional view of a spiral bevel gear, showing the position of two successive tools on a cutter in cutting relation to a tooth, according to my invention;

Figure 2 is a perspective view of one tooth of a straight toothed gear, made according to the invention;

Figure 3 is a side elevation, partly in section, of the other member of the pair, or in the present instance, the spiral bevel pinion for meshing relation with the bevel gear shown in Figure 1, and illustrating the position of the tools of the cutter in cutting relationship;

Figure 4 is a perspective view of one tooth of a straight toothed pinion made according to the invention, for engagement with the gear tooth shown in Figure 2;

Figure 5 is a sectional view of the gear and pinion in meshing relationship;

Figure 6 is a diagrammatic plan view, showing the relation of the tools when cutting a spiral bevel gear, each pair of tools being spread apart laterally and cutting in the same tooth space on opposite faces;

Figure 7 is a similar view, with the tools disposed so that all cut in the same plane, and operate in successive tooth spaces;

Figure 8 is a partial sectional view of a gear blank before generation;

Figure 9 is a plan view of a straight toothed gear, and

Figure 10 is a side view of a mating gear and pinion.

This application is intended to cover the product of the method and apparatus described in my co-pending application filed September 12, 1923, Serial No. 662,274, the invention embodying in general a pair of intermeshing gears, preferably a bevel gear and pinion, the gear being made with a series of tools arranged exteriorly and radially of a rotary disc-like cutter while the other member of the pair is made with a series of tools arranged interiorly and radially of a rotary ring-like cutter.

In gear generating processes, the practice has been to employ a tool with a cutting edge inclined to its plane of rotation or travel, and where such an inclined cutting edge is part of a circular edge mill that sweeps in a circle, the contour of the tooth produced varies from end to end, by reason of the circular travel of the inclined cutting edge. This is overcome by employing a cutter with exteriorly arranged tools for producing one member of a pair and a cutter with interiorly arranged tools for producing the other member, so that the irregularity or changing contour of the tooth in one member of the pair is reversed in the other member, and the two gears thus produced are conjugate one to the other.

Figure 1 illustrates a bevel gear 1 formed by rotating a series of tools 2 on a large diameter cutter, in the path of a circle 3, the tools being mounted exteriorly and radially on a suitable head or support, not shown, and travelling inside the circle 3. Movement of the tools in the circular path described produces a tooth space with a concave bottom 4, as shown in Figure 2, while the tooth itself has its thinnest portion at the center, and is thicker toward the ends of the tooth. The tooth sides are formed each on a continuous curve, being concave from end to end, and the points about which the sides are curved lie on opposite sides of the teeth. The involute or generated profile may be produced by imparting a proper rolling motion between the gear blank and cutter, during the cutting operation, corresponding to the rolling of a gear on a rack or crown gear. As this generating principle is well known in the art of gear cutting, it is unnecessary to disclose it in the present application. It forms no part of my invention, except in combination with a system of cutting with tools arranged exteriorly and interiorly of circular milling cutters. The tooth may be straight or curved lengthwise, depending on whether a straight or spiral toothed gear is cut.

Figure 3 illustrates a pinion 5 which may mesh with the gear 1, and is formed by a series of tools 6 arranged interiorly of a suitable ring-shaped holder or cutter, and rotating about a center so as to cause the tools to travel in a circular path 7, and outside said circle. This motion produces a tooth space with a convex bottom 8, as shown in Figure 4, the teeth having sides which are formed on continuous curves which are curved about points which lie on opposite sides of the teeth and being thicker at their center portions and thinner toward their end portions. The changing contour or cross section of the tooth of a pinion is the reverse of that of the gear, so that the teeth of one are conjugate to those of the other, and proper meshing and accurate engagement necessarily ensues between the two members of the pair.

The cutter head or support in each case is sufficiently large in diameter so that each tool will travel across the face of the gear, forming a slight curve at the bottom of the tooth space, and the convexity or concavity of the tooth space bottom has no effect on the engagement between the teeth since it extends beyond the base of the tooth. This is indicated in Figure 5, where the concave bottom 4 of the gear is above the face 9 of the cooperating tooth on the pinion, while the convex bottom 8 on the pinion is below the face 10 of the tooth on the gear. Both cutters have the same pitch diameter, and provision for adjusting the tools to maintain such diameter as they are sharpened.

The invention is applicable to generated or non-generated gears, having teeth which are either straight or curved lengthwise. In the formation of a straight tooth gear, the blank is held stationary except for its generating motion, if any, and the tool is simply rotated in engagement with the blank. The teeth of straight tooth gears so produced are shown in Figs. 2, 4 and 9.

In cutting longitudinally curved tooth gears, the tools are preferably so arranged on the cutter head as to cooperate successively with different teeth, according to the hobbing system, that is to say, one tool moves through one tooth space while the next succeeding tool engages a succeeding tooth space, and so on, the gear blank and cutter being rotated in timed relation, to bring about this continuous cutting or hobbing of the blank.

The continuous rotation of the cutter and blank produces a lengthwise curvature or spiral on the tooth, and this motion is independent of the generating motion or relative bodily roll between the gear blank and cutter during the cutting operation, which produces a curved profile or involute cross section on the tooth. A curved tooth pair produced according to this invention is shown in Figs. 1 and 3.

Figure 6 illustrates diagrammatically the travel of the tools through the blank, in cutting a longitudinally curved tooth gear, where the tools are arranged in pairs, each pair travelling through a tooth space and cutting on adjacent tooth faces bounding the tooth space. In this arrangement the points of each pair of tools are spaced laterally a distance $x$, which is determined by the tooth proportions.

In Figure 7 is disclosed a tool arrangement for cutting longitudinally curved tooth gears in which the points of all the tools travel in a single plane, and cut alternately on one side and then on the other side of different teeth. The tools may be spaced so as to cut on every tooth, or may be arranged to skip one or more teeth, the distance between the tools being determined by the proportions of the teeth and the distance between successive cuts. The successively cut faces are indicated by the vertical lines in Figure 8, and the tools are spaced, so that distance $c$ bears the same relation to $d$, see Figure 7, as C bears to D, Figure 8. Where all the tools travel in the same plane, as in Fig. 7, each gear of the pair may be cut in one operation. But where the tools are offset, or spread apart as in Figure 6, in cutting one member of the pair so that the points of each pair of tools travel in parallel paths, the other member of the pair must be cut only one face at a time, in order to mesh properly with the first gear. When curved tooth gears are being cut and both members are generated, as by rolling on a crown gear which is represented by the tool, the tool rotates about its axis which is at an angle to the axis of the crown gear and the tool and blank are given a relative generating motion about the axis of the crown gear. In addition, a continuous indexing motion is imparted to the blank. This continuous indexing motion is an added relative motion between tool and blank about the axis of the crown gear. The crown gear, therefore, has tooth surfaces such as might be generated by a single line rotating about an axis at an angle to the axis of the crown gear and simultaneously rotating about the axis of the crown gear.

The invention is applicable to both bevel and spur gears, straight tooth or spiral gears, and while disclosed with reference to a pair of generated gears, it may be used with equal advantage where one gear of a pair is generated and the other or meshing gear is non-generated, and it is the intention to cover by this application any changes or departures coming within the intent or purpose of the invention as set forth in the foregoing description, or the scope of the following claims.

I claim:

1. A gear provided with tooth spaces having curved bottoms and with longitudinally curved teeth, said teeth having side faces which are curved from end to end about points lying on opposite sides of the teeth.

2. A bevel gear provided with tooth spaces having curved bottoms and with longitudinally curved teeth, said teeth having side faces which are curved from end to end about points lying on opposite sides of the teeth.

3. A pair of gears, one of which has tooth spaces with convex bottoms and longitudinally curved teeth whose side faces are convex from end to end, and the other of which has tooth spaces with concave bottoms and longitudinally curved teeth whose side faces are concaved from end to end.

4. A pair of conjugate generated gears, one of which has tooth spaces with convex bottoms and teeth thicker at the center than at their ends and the other of which has tooth spaces with concave bottoms and teeth thicker at their ends than at the center, the cross sectional contour of a tooth space on one gear being complementary to the cross sectional contour of a tooth on the other gear.

5. A pair of tapered gears, one of which has tooth spaces with convex bottoms and longitudinally curved teeth whose side faces are convex from end to end, and the other of which has tooth spaces with concave bottoms and longitudinally curved teeth whose side faces are concave from end to end.

6. A pair of tapered gears, one of which is provided with longitudinally curved teeth whose side faces are convex from end to end, and the other of which is provided with longitudinally curved teeth whose side faces are concave from end to end.

7. A pair of gears, one of which has tooth spaces with convex bottoms and teeth whose side faces are convexed from end to end while the other has tooth spaces with concaved bottoms and teeth whose side faces are concaved from end to end.

In witness whereof, I have hereunto signed my name.

ERNEST C. HEAD.